United States Patent
Kalus et al.

(10) Patent No.: US 8,567,839 B2
(45) Date of Patent: Oct. 29, 2013

(54) MULTI-PART EQUIPMENT PIECE FOR A VEHICLE AND CONNECTING METHOD

(75) Inventors: Holger Kalus, Moers (DE); Gunter Kascherus, Nettetal (DE)

(73) Assignee: Johnson Controls Technology Company, Holland, MI (US)

( * ) Notice: Subject to any disclaimer, the term of this patent is extended or adjusted under 35 U.S.C. 154(b) by 119 days.

(21) Appl. No.: 12/389,258

(22) Filed: Feb. 19, 2009

(65) Prior Publication Data

US 2009/0200832 A1    Aug. 13, 2009

(30) Foreign Application Priority Data

Oct. 2, 2006 (DE) .......................... 10 2006 047 082
Dec. 12, 2006 (DE) .......................... 10 2006 058 491
Aug. 31, 2007 (WO) ................. PCT/EP2007/007604

(51) Int. Cl.
B60R 13/01 (2006.01)

(52) U.S. Cl.
USPC ........................................................ 296/39.1

(58) Field of Classification Search
USPC ........ 24/593.1, 602, 693, 297, 464, 289, 570,
24/571, 652, 656, 662, 663, 664, 682.1,
24/686, 687, 688, 691, 703.1, 704.1;
220/690; 296/1.09, 39.1, 146.7, 153;
403/244, 270, 274, 276, 348, 349, 361,
403/375, 382, 403
See application file for complete search history.

(56) References Cited

U.S. PATENT DOCUMENTS

| | | | | | |
|---|---|---|---|---|---|
| 48,897 | A | * | 7/1865 | Blodgett | 24/688 |
| 382,151 | A | * | 5/1888 | Goodrich | 220/690 |
| 552,257 | A | * | 12/1895 | Norton | 24/688 |
| 753,976 | A | * | 3/1904 | Goss | 281/18 |
| 1,975,622 | A | * | 10/1934 | Schermerhorn | 297/452.55 |
| 2,104,628 | A | * | 1/1938 | Warren | 446/75 |
| 2,120,470 | A | * | 6/1938 | Patterson | 229/198.2 |
| 2,164,634 | A | * | 7/1939 | Barrett | 403/274 |
| 2,760,813 | A | * | 8/1956 | Colm | 296/68.1 |
| 2,769,679 | A | * | 11/1956 | Wiseman | 312/350 |
| 2,848,134 | A | * | 8/1958 | Carlson | 220/3.94 |
| 3,367,809 | A | * | 2/1968 | Soloff | 156/73.1 |
| 3,601,752 | A | * | 8/1971 | Pauza | 439/870 |
| 4,429,486 | A | * | 2/1984 | Bjornstad | 446/110 |
| 4,456,644 | A | * | 6/1984 | Janz et al. | 428/158 |

(Continued)

FOREIGN PATENT DOCUMENTS

DE    7823546    11/1978
DE    3605604    8/1987

(Continued)

OTHER PUBLICATIONS

International Search Report for application No. PCT/EP2007/007604 mailed Dec. 12, 2007.

Primary Examiner — Kiran B Patel
(74) Attorney, Agent, or Firm — Fletcher Yoder P.C.

(57) ABSTRACT

An equipment piece includes first and second components, such as a vehicle door armrest and a vehicle door. The first component is insertable in a recess, such as a slot, in the second component. The second component may be secured in the first by deformation of a projecting portion configured as a tab having a wall thickness smaller than its longitudinal extension. The tab is anchorable non-positively in the second component after inserting into the recess and pending about a longitudinal axis of the tab.

8 Claims, 1 Drawing Sheet

(56) References Cited

U.S. PATENT DOCUMENTS

Figure 1:
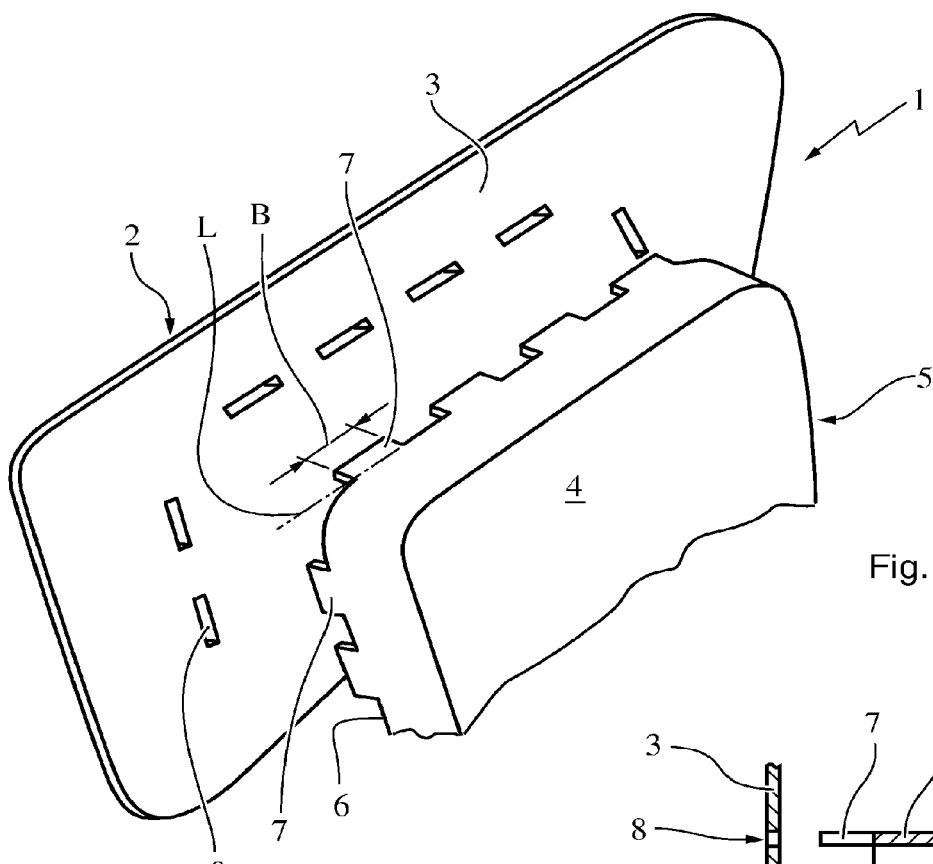

| | | | | |
|---|---|---|---|---|
| 4,728,143 A * | 3/1988 | Tanino et al. | | 296/153 |
| 4,767,298 A * | 8/1988 | Bocchicchio et al. | | 425/112 |
| 4,875,795 A * | 10/1989 | Anderson | | 403/279 |
| 4,892,770 A * | 1/1990 | Labrie | | 428/71 |
| 4,897,919 A * | 2/1990 | Wheeler | | 29/845 |
| 4,983,066 A * | 1/1991 | Becker et al. | | 403/274 |
| 5,172,954 A * | 12/1992 | Yamazaki et al. | | 296/180.1 |
| 5,325,632 A * | 7/1994 | Djavairian et al. | | 49/502 |
| 5,357,728 A * | 10/1994 | Duncanson | | 52/592.4 |
| 5,433,498 A * | 7/1995 | Ishiwata | | 296/39.1 |
| 5,588,667 A * | 12/1996 | Emambakhsh et al. | | 280/728.2 |
| 5,945,200 A * | 8/1999 | Suzuki | | 428/192 |
| 6,076,246 A * | 6/2000 | McCooey | | 29/469.5 |
| 6,176,536 B1 * | 1/2001 | Miller et al. | | 296/37.7 |
| 6,248,205 B1 * | 6/2001 | Scheidmantel et al. | | 156/309.6 |
| 6,289,651 B1 * | 9/2001 | Le Bras | | 53/394 |
| 6,315,076 B1 | 11/2001 | Bruck et al. | | |
| 6,454,124 B1 * | 9/2002 | Edwards et al. | | 220/636 |
| 6,723,950 B1 * | 4/2004 | Lund | | 219/121.64 |
| 6,781,088 B2 * | 8/2004 | Grubb et al. | | 219/121.64 |
| 6,854,783 B2 * | 2/2005 | Teranishi et al. | | 296/70 |
| 6,921,571 B2 * | 7/2005 | Funakoshi | | 428/156 |
| 7,008,003 B1 * | 3/2006 | Hirose et al. | | 296/146.7 |
| 7,104,590 B2 * | 9/2006 | Dooley et al. | | 296/153 |
| 7,347,470 B2 * | 3/2008 | Steelman | | 296/1.09 |
| 7,360,964 B2 * | 4/2008 | Tsuya et al. | | 403/280 |
| 7,536,830 B2 * | 5/2009 | Clark et al. | | 49/377 |
| 7,644,969 B2 * | 1/2010 | Foster et al. | | 296/1.08 |
| 7,651,145 B2 * | 1/2010 | Prokop et al. | | 296/37.12 |
| 7,789,455 B2 * | 9/2010 | Hall et al. | | 296/187.05 |
| 2003/0165664 A1 * | 9/2003 | Carroll et al. | | 428/138 |
| 2004/0060644 A1 * | 4/2004 | Danko | | 156/216 |
| 2004/0108751 A1 * | 6/2004 | Scheidmantel et al. | | 296/187.05 |
| 2004/0169354 A1 * | 9/2004 | Kahler et al. | | 280/728.2 |
| 2005/0023861 A1 * | 2/2005 | Hirotani et al. | | 296/187.05 |
| 2009/0256374 A1 * | 10/2009 | Augustyn | | 296/1.09 |

FOREIGN PATENT DOCUMENTS

| | | | |
|---|---|---|---|
| DE | 297 14 749 U1 | | 11/1997 |
| DE | 199 00 310 A1 | | 7/1999 |
| DE | 203 03 303 U1 | | 7/2003 |
| EP | 1256484 A | | 11/2002 |
| GB | 2121909 A | * | 1/1984 |
| JP | 03000308 A | * | 1/1991 |
| JP | 06270679 A | * | 9/1994 |

* cited by examiner

MULTI-PART EQUIPMENT PIECE FOR A VEHICLE AND CONNECTING METHOD

CROSS REFERENCE TO RELATED APPLICATIONS

This application claims priority from and the benefit of PCT Application No. PCT/EP2007/007604, filed on Aug. 31, 2007; and German Patent No. DE 10 2006 047 082.6, filed on Oct. 2, 2006; and German Patent DE 10 2006 058 491.0, filed on Dec. 12, 2006; all entitled "Multi-Part Equipment Piece for a Vehicle and Connecting Method", which are herein incorporated by reference.

BACKGROUND

The invention relates to an equipment piece with a first and a second component for the interior of a vehicle, in which at least one protrusion of the first component may be inserted into a recess of the second component and may be secured there by deformation of the projecting portion, as well as a method for producing said equipment part.

SUMMARY

A generic equipment piece in the form of a door trim panel and a corresponding method are known from the publication EP 1 256 484 A1. In this case, a first component in the form of an armrest is connected to a second component configured as a support, by a rivet-like protrusion on the armrest being inserted through a recess in the support. Subsequently, the projecting portion of the protrusion projecting from the support is widened, so that both components are connected unreleaseably to one another to form a structure which is disadvantageous in the event of a crash as it is relatively hard. Moreover, where there is a high proportion of non-fusible fibers in the rivet-like protrusion, this process is no longer possible, or only results in a connection of unsatisfactory strength. Similarly, such protrusions may generally only be produced by injection-molding the armrest, but not by compressing flat semi-finished products.

The object of the invention is to improve the generic equipment piece with regard to manufacture and crash behavior.

The object is achieved in a generic equipment piece by the protrusion being configured as a tab having a wall thickness which is smaller than its longitudinal extension, and which may be anchored non-positively in the second component after insertion into the recess configured as a slot by bending about a longitudinal axis of the tab. As a result, hard material thickenings in the connecting region are avoided. Moreover, this bending back is also possible with many materials which resist spreading apart, within the context of a known rivet connection. The connection, therefore, is implemented in a substantially unreleaseable manner. Separation of the components is thus only possible by damaging or destroying at least one component.

Preferably it is provided that the tab may be brought to bear at least partially against the surface of the second component. Moreover, advantageously the connection is not made simply at one location but by a number of tabs arranged in a linear manner, which may be displaced into a corresponding number of slots arranged in a linear manner.

The wall thickness of the tab preferably substantially corresponds to the wall thickness of the adjacent regions of the first component, so that the tabs may be produced in a simple manner by punching out and/or laser cutting the edge region of the first component. Preferably, the connection of the tab to the second component additionally takes place by a material connection, for example by heating and melting the regions of the first and second component subsequently brought into surface contact.

DRAWINGS

Figure 2A:
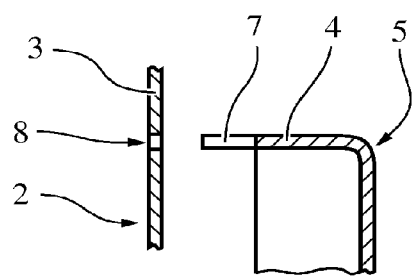
Figure 2B:
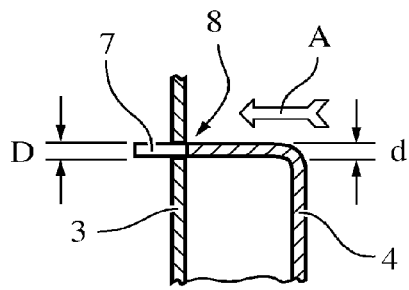
Figure 2C:
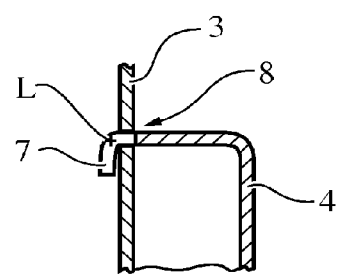

The figures show by way of example and schematically an embodiment of the invention, in which:

FIG. 1 shows a perspective view of the first and second component before joining, FIG. 2A-2C shows a section through the first and second component before, during and after joining.

DETAILED DESCRIPTION

In FIG. 1 a vehicle equipment piece 1 is shown in detail with a first component 2 in the form of a segment 3 of a door trim panel and a second component 5 configured as an armrest 4. The armrest 4 designed in a trough-like manner and consisting at least partially of a polypropylene/natural fiber composite, is provided on its edge 6 facing in the direction of the segment 3 with a number of projecting tabs 7, whilst the segment 3 has the same number of slots 8 configured in a congruent manner. The tabs 7 are preferably incorporated by punching out the semi-finished product of the armrest 4 which is still flat or already three-dimensionally deformed. At this time, the armrest 4 may optionally be already provided with a decorative layer and/or upholstery. It is understood that the length of the tabs 7 has to be greater than the thickness of the flat segment 3 in the region of the slots 8, in particular by approximately 3 to 10 times. The slots 8 are also advantageously punched out of the segment 3.

The components 2, 5 thus provided (see section according to FIG. 2A) are then joined by inserting the tabs 7 into the slots 8 (arrow A in FIG. 2B) and subsequently bending back the protruding tabs 7 about the longitudinal axes L thereof from a position extending at right angles into a position approximately parallel to the segment 3 (FIG. 2C). After insertion, but before bending back, the tabs 7 are preferably heated by warm air and may be more easily deformed by softening the thermoplastic components thereof. Melting-on of the thermoplastic components of the armrest 4 and, components of the segment 3 compatible with these additionally leads to a material connection between the components 2, 5. Advantageously, the segment 3 also consists of a polypropylene/natural fiber composite.

The connecting region produced in this manner has only a very small material accumulation which, on the one hand, reduces the material consumption and, on the other hand, avoids undesirable local hardening of the vehicle equipment piece 1 in the event of a crash (for example in the event of a side impact). In the embodiment, moreover, both the insertion of the tabs 7 and the deformation thereof by using appropriate punches may take place by movements in the Y-direction.

The invention claimed is:
1. An equipment piece comprising:
a first and a second component for the interior of a vehicle, wherein the first component is made from a material comprising thermoplastic, and wherein the first component comprises a plurality of protrusions with projecting portions configured as tabs arranged in a linear manner, and the second component comprises a corresponding plurality of slots arranged in a linear manner;
wherein the plurality of tabs is configured to be inserted through the corresponding plurality of slots, and to be secured to the second component by deforming the projecting portion of each protrusion;

wherein each tab has a wall thickness (D) which is smaller than the longitudinal extension (B) of the tab, the plurality of tabs being anchorable non-positively in the second component after inserting through the corresponding plurality of slots by bending about a longitudinal axis (L) of each tab; and wherein each tab is connected to the second component by a material connection formed by heating and melting adjacent regions of the first component and the second component.

2. The equipment piece as claimed in claim 1, wherein each tab may be brought to bear at least partially against surface of the second component.

3. The equipment piece as claimed in claim 1, wherein each tab has a wall thickness corresponding substantially to the wall thickness (d) of adjacent regions of the first component.

4. The equipment piece as claimed in claim 1, wherein the first component is an armrest and the second component is a support of a vehicle door.

5. A method for producing the equipment piece as claimed in claim 1, wherein at least one tab is heated before bending to soften the thermoplastic.

6. The method as claimed in claim 5, wherein each tab and each slot are made by punching out or laser cutting the first and second components.

7. The equipment piece as claimed in claim 1, wherein the material comprises a thermoplastic/fiber composite.

8. The equipment piece as claimed in claim 7, wherein the thermoplastic comprises polypropylene, and the fiber comprises natural fiber.

\* \* \* \* \*